(12) United States Patent
Francis (10) Patent No.: US 7,383,582 B1
(45) Date of Patent: Jun. 3, 2008

(54) SYSTEMS AND METHODS FOR PERFORMING ELECTRONIC SURVEILLANCE

(75) Inventor: Robert Michael Francis, Chantilly, VA (US)

(73) Assignee: Federal Network Systems, LLC, Arlington, VA (US)

( * ) Notice: Subject to any disclaimer, the term of this patent is extended or adjusted under 35 U.S.C. 154(b) by 781 days.

(21) Appl. No.: 10/211,922

(22) Filed: Aug. 2, 2002

(51) Int. Cl.
*H04L 9/00* (2006.01)

(52) U.S. Cl. .................... 726/26; 726/27; 726/28; 726/30; 713/160; 713/178; 713/179

(58) Field of Classification Search ............... 713/160; 726/20, 9
See application file for complete search history.

(56) References Cited

U.S. PATENT DOCUMENTS

| | | | |
|---|---|---|---|
| 5,796,942 A * | 8/1998 | Esbensen ..................... | 726/13 |
| 5,881,132 A * | 3/1999 | O'Brien et al. ............... | 379/35 |
| 5,987,612 A * | 11/1999 | Takagawa et al. ............ | 726/9 |
| 5,991,881 A * | 11/1999 | Conklin et al. ............... | 726/22 |
| 6,014,089 A * | 1/2000 | Tracy et al. ............. | 340/870.02 |
| 6,233,313 B1 * | 5/2001 | Farris et al. ........... | 379/112.01 |
| 6,374,307 B1 * | 4/2002 | Ristau et al. ............... | 709/249 |
| 6,453,345 B2 * | 9/2002 | Trcka et al. ................ | 709/224 |
| 6,504,907 B1 * | 1/2003 | Farris et al. .................. | 379/35 |
| 6,549,613 B1 * | 4/2003 | Dikmen ....................... | 379/70 |
| 6,577,865 B2 * | 6/2003 | Dikmen et al. ............. | 455/433 |
| 6,711,689 B2 * | 3/2004 | Lumme et al. ............... | 726/22 |
| 6,727,811 B1 * | 4/2004 | Fendis ....................... | 340/506 |
| 6,996,722 B1 * | 2/2006 | Fairman et al. ............. | 713/192 |
| 2001/0039579 A1 * | 11/2001 | Trcka et al. ................ | 709/224 |
| 2001/0052081 A1 * | 12/2001 | McKibben et al. ......... | 713/201 |
| 2002/0009973 A1 * | 1/2002 | Bondy et al. .............. | 455/67.2 |
| 2002/0010679 A1 * | 1/2002 | Felsher ........................ | 705/51 |
| 2002/0078384 A1 * | 6/2002 | Hippelainen ................ | 713/201 |
| 2002/0105911 A1 * | 8/2002 | Pruthi et al. ................. | 370/241 |
| 2003/0110396 A1 * | 6/2003 | Lewis et al. ................ | 713/201 |
| 2003/0200311 A1 * | 10/2003 | Baum ......................... | 709/224 |

OTHER PUBLICATIONS

Kent & Atkinson, "RFC 2406: IP Encapsulating Security Payload", http://www.ietf.org/rfc/rfc2406.txt, Nov. 1998.*

"Digital Signal Standard (DSS)"—Federal Information Processing Standards Publication 186; May 19, 1994; 17 pages.

"Secure Hash Standard"—Federal Information Processing Standards Publication 180-1; Apr. 17, 1995; 18 pages.

"Independent Technical Review of the Carnivore System Draft Report"—ITT Research Institute, Lanham, Maryland; Nov. 17, 2000; 15 pages.

(Continued)

*Primary Examiner*—Ayaz Sheikh
*Assistant Examiner*—Saoussen Besrour (57) ABSTRACT

A system performs an electronic surveillance in a packet-switched network. The system includes a first card (300), a second card (400), and an electronic surveillance device (120). The first card (300) stores first data identifying a first operational mode and second data identifying a time period. The second card (400) stores activation information. The electronic surveillance device (120) reads the first card (300) and conditions itself for operating in the first operational mode for the specified time period. The electronic surveillance device (120) also reads the second card (400) and performs a packet capture operation in accordance with the first operational mode for the specified time period in response to reading the second card (400).

17 Claims, 5 Drawing Sheets

OTHER PUBLICATIONS

Mencik, Stephen—Executive Security Briefing "The Patriot Act and Carnivore: Reasons for concern?," Dec. 6, 2001, 3 pages http://searchsecurity.techtarget.com/tip/1,289483,sid14_gci784713,00.html.

Federal Information Processing Standards Publication 140-2: "Security Requirements for Cryptographic Modules," May 25, 2001; 63 pages.

* cited by examiner

SYSTEMS AND METHODS FOR PERFORMING ELECTRONIC SURVEILLANCE

FIELD OF THE INVENTION

The present invention relates generally to communications systems and, more particularly, to systems and methods for performing lawful authorized electronic surveillance.

BACKGROUND OF THE INVENTION

The Communications Assistance to Law Enforcement Act (CALEA, Public Law 103-414) requires service providers to support lawful authorized electronic surveillance (LAES) activities as specified in United State Codes (U.S.C.) Titles 3, 18, 47, and 50. In packet-switched networks, there has been conflict between the requirements of law and the practical technical implementation of electronic surveillances. Specifically, the Federal Communications Commission, Third Report and Order (August 1999), permits an interim solution to law enforcement where the 'full content' of packet-switched communications can be captured and post-processing minimization performed on the communications to meet the legal limits of surveillance analogous to a pen register/trap and trace type surveillance (where the surveillance is limited to collecting From and To portions of e-mails, a list of web sites visited, or other types of "header" information) defined in U.S.C. Title 18.

Current electronic surveillances are performed by Carnivore, a system developed by the Federal Bureau of Investigation. This system is not satisfactory, however, to a number of privacy groups and civil libertarians due in part to its intrinsic functional capability to exceed the scope of Title 18 (pen-mode) surveillances in packet-switched networks. The Carnivore system captures full packets and then breaks the packets down to obtain the addressing information that is contained in the packets' headers while at the same time relying on the trustworthiness of the law enforcement agent(s) performing the surveillance to not look at the message content of the packets. Moreover, the Carnivore system fails to provide an audit capability. Thus, the law enforcement agency that is conducting the surveillance has no way to show that the user settings for Carnivore correspond to those allowed in the warrant. There is also no way to identify which agent was at fault should Carnivore be used for illegal electronic surveillances.

Therefore, there exists a need for systems and methods that improve the performance of law-authorized electronic surveillances.

SUMMARY OF THE INVENTION

Systems and methods consistent with the present invention address this and other needs by providing an electronic surveillance device that allows law enforcement personnel to prove that they have conducted a lawful electronic surveillance in a packet-switched network in accordance with the constraints imposed by a warrant authority.

In accordance with the purpose of this invention as embodied and broadly described herein, a method for performing an electronic surveillance is disclosed. The method includes conditioning a packet capture device, conducting the electronic surveillance using the packet capture device to produce a record, and performing at least one of encrypting, digitally signing, and hashing of the record.

In another implementation consistent with the present invention, an electronic surveillance device is disclosed. The electronic surveillance device includes logic that conditions the electronic surveillance device for a particular mode of operation and duration, logic that records packets in a network based on the configured mode of operation to create a surveillance record, logic that determines whether the duration has been exceeded, and logic that performs one or more of encrypting, digitally signing, and hashing of the surveillance record when the duration has been exceeded.

In yet another implementation consistent with the present invention, a computer-readable medium for configuring an electronic surveillance device is disclosed. The computer-readable medium includes first data for causing the electronic surveillance device to operate in one of a plurality of modes and second data for causing the electronic surveillance device to operate for a predetermined period of time.

In a further implementation consistent with the present invention, a computer-readable medium that is associated with a law enforcement agent and used in connection with an electronic surveillance is disclosed. The computer-readable medium includes first data for enabling the law enforcement agent to access an electronic surveillance device, and a key to be used in digitally signing a surveillance record. The key uniquely identifies the law enforcement agent.

In yet a further implementation consistent with the present invention, a system that performs an electronic surveillance is disclosed. The system includes a first card, a second card, and an electronic surveillance device. The first card stores first data identifying an operational mode and second data identifying a time period. The second card stores activation information. The electronic surveillance device reads the first card, conditions itself for operating in the operational mode and for the time period, reads the second card, and performs a packet capture operation in accordance with the first operational mode and for the time period in response to reading the second card.

BRIEF DESCRIPTION OF THE DRAWINGS

The accompanying drawings, which are incorporated in and constitute a part of this specification, illustrate an embodiment of the invention and, together with the description, explain the invention. In the drawings.

DETAILED DESCRIPTION

The following detailed description of implementations consistent with the present invention refers to the accompanying drawings. The same reference numbers in different drawings may identify the same or similar elements. Also, the following detailed description does not limit the invention. Instead, the scope of the invention is defined by the appended claims and their equivalents.

Implementations consistent with the present invention provide an electronic surveillance device that improves the way in which electronic surveillances are conducted. The electronic surveillance device uses a combination of public keys, private keys, smart cards, digital certificates, and operating system wrappers to improve confidentiality and integrity of the surveillance records and authentication and identification of the authorities associated with the electronic surveillance.

Exemplary System

Figure 1:
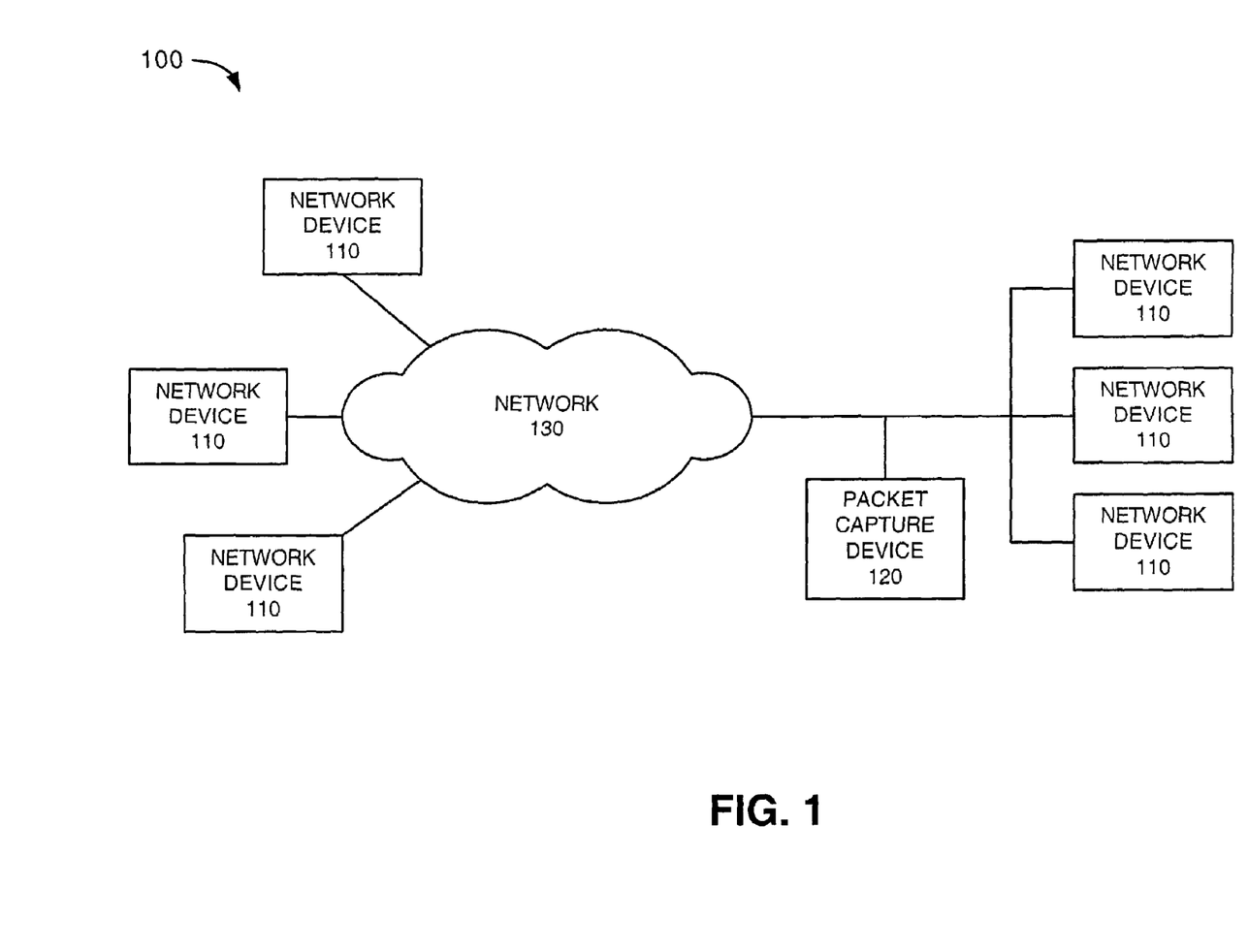
FIG. 1 illustrates an exemplary system in which systems and methods, consistent with the present invention, may be implemented.

FIG. 1 illustrates an exemplary system 100 in which systems and methods, consistent with the present invention, may be implemented. System 100 includes a group of network devices 110, a packet capture device 120, and a network 130. The number of components illustrated in FIG. 1 has been shown for simplicity. It will be appreciated that a typical system may include more or fewer components than illustrated in FIG. 1.

Network 130 may include one or more conventional networks, such as the Internet, an intranet, a wide area network (WAN), a local area network (LAN), or other types of networks that are capable of transmitting packets. A network device 110 may include any type of device that is capable of transmitting and receiving data via network 130, such as a server, personal computer, laptop computer, personal digital assistant, cell phone, pager, or the like. Network devices 110 may connect to network 130 via wired, wireless, or optical connections.

Packet capture device 120 captures traffic in network 130 and provides law enforcement personnel with a way to prove that a Title 18 type surveillance (i.e., a pen register or trap and trace surveillance) has been conducted in a packet-switched architecture in accordance with the constraints imposed by the warrant authority. As will be described in detail below, packet capture device 120 uses encryption techniques to ensure that surveillance records are not examined by anyone other than authorized officials. Packet capture device 120 uses digital signatures to authenticate and identify the authorities that have authorized the surveillance and that have conducted the surveillance. Packet capture device 120 also uses a hashing function to validate the integrity of the surveillance records and ensure that records have not been altered or corrupted.

Figure 2:
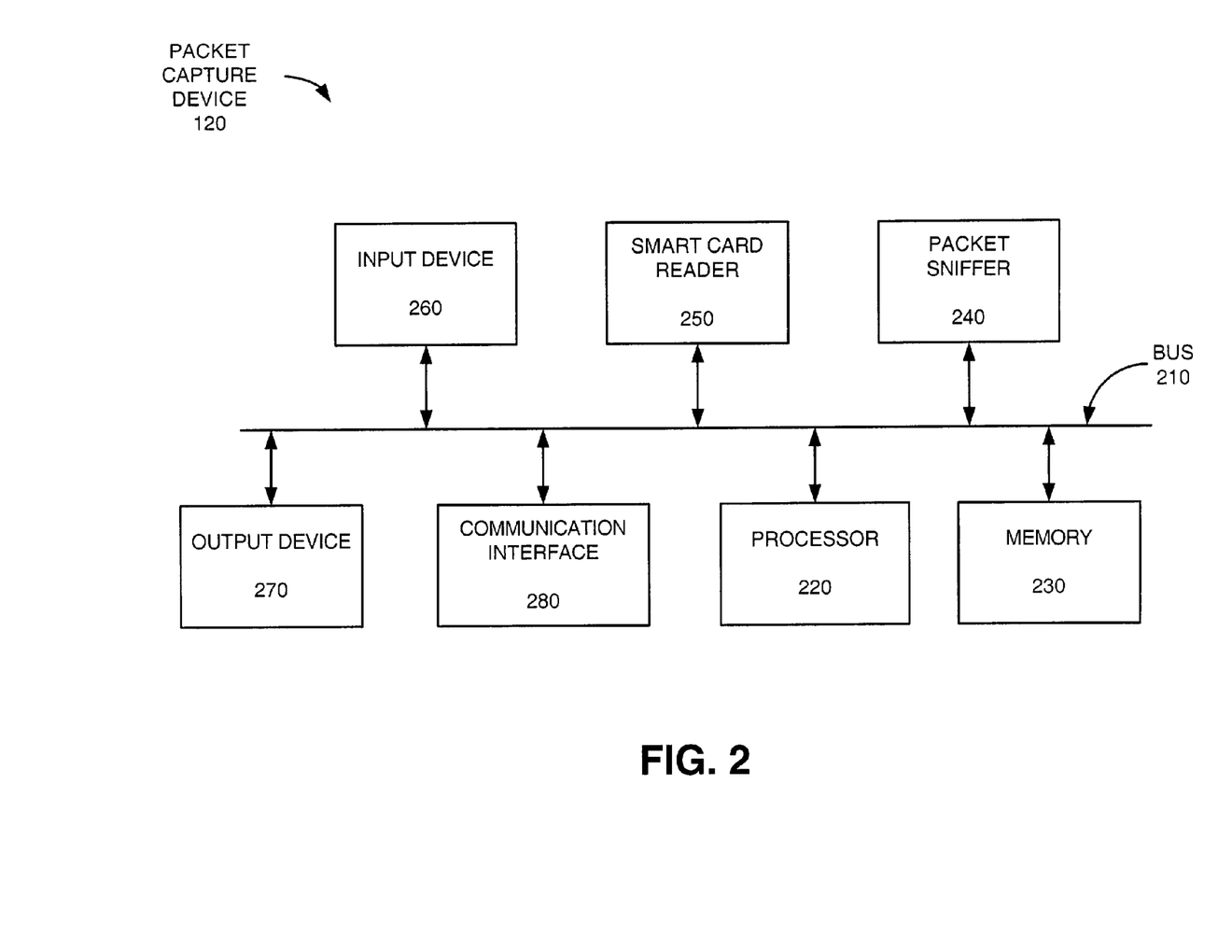
FIG. 2 illustrates an exemplary configuration of the packet capture device of FIG. 1 in an implementation consistent with the principles of the invention.

FIG. 2 illustrates an exemplary configuration of packet capture device 120 in an implementation consistent with the principles of the invention. As illustrated, packet capture device 120 includes a bus 210, a processor 220, a memory 230, a packet sniffer 240, a smart card reader 250, an input device 260, an output device 270, and a communication interface 280. Bus 210 permits communication among the components of packet capture device 120.

Processor 220 may include any type of conventional processor or microprocessor that interprets and executes instructions. Memory 230 may include a random access memory (RAM) or another type of dynamic storage device that stores information and instructions for execution by processor 220; a read only memory (ROM) or another type of static storage device that stores static information and instructions for use by processor 220; and/or some other type of magnetic or optical recording medium and its corresponding drive.

Packet sniffer 240 monitors and captures data transmitted in a network, such as network 130. In one implementation, packet sniffer 240 may operate in one of two modes. In the first mode (called a "pen" mode), packet sniffer 240 captures only routing and addressing information from packets in the network. In the second mode (called a "full capture" mode), packet sniffer 240 captures full packets, including all of the packet content.

Smart card reader 250 may include one or more conventional devices capable of reading smart cards. As will be described in detail below, smart card reader 250 includes devices for reading a warrant card that, inter alia, defines the conditions (e.g., mode and duration) for a surveillance operation. Smart card reader 250 also includes devices for reading an agent card that, inter alia, enables an agent to access packet capture device 120 and provides for authentication and identification of the agent through the use of a private key stored on the agent card.

Input device 260 may include one or more conventional mechanisms that permit an operator to input information to packet capture device 120, such as a keyboard, a mouse, a pen, a biometric mechanism, and the like. Output device 270 may include one or more conventional mechanisms that output information to the operator, including a display, a printer, a speaker, etc. Communication interface 280 may include any transceiver-like mechanism that enables packet capture device 120 to communicate with other devices and/or systems.

Execution of sequences of instructions contained in a computer-readable medium, in conjunction with information from a warrant card and an agent card, may cause processor 220 to implement functional operations, such as encrypting data, executing a digital signature algorithm, and performing hash functions, as described below. A computer-readable medium may include one or more memory devices, such as memory 230, or carrier waves. Such instructions may be read into memory 230 from another computer-readable medium or from another device via communication interface 280. In alternative embodiments, hardwired circuitry, such as an application specific integrated circuit (ASIC), may be used in place of or in combination with software instructions to implement the present invention. Thus, the present invention is not limited to any specific combination of hardware circuitry and software.

Figure 3:
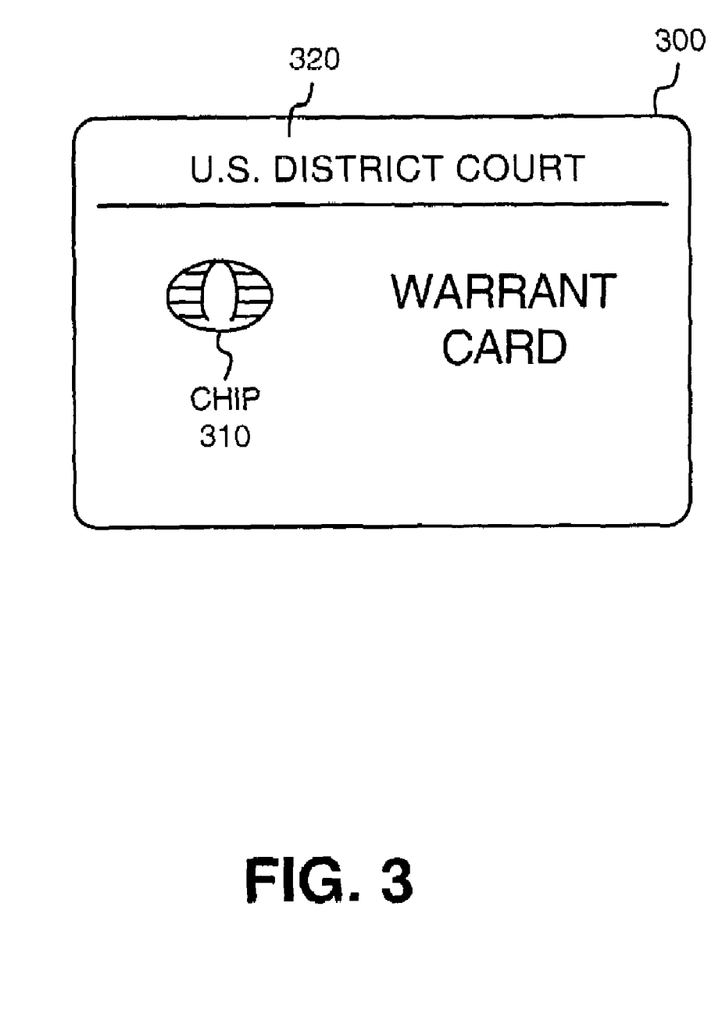
FIG. 3 illustrates an exemplary configuration of a warrant card in an implementation consistent with the present invention.

FIG. 3 illustrates an exemplary configuration of a warrant card 300 in an implementation consistent with the present invention. As illustrated, warrant card 300 may include a microprocessor chip 310 and may optionally include information 320 that identifies the court that issued warrant card 300. Warrant card 300 may also include information (not shown) that identifies the official that issued warrant card 300. The microprocessor chip 310 may contain a processor and memory configured in a manner similar to conventional smart cards.

Warrant card 300 may include a warrant authority certificate. In one implementation, the warrant authority certificate may conform to the standard X.509v.3 format with the addition of a special attribute (a certificate extension) that is specific to packet capture device 120. The certificate extension identifies the proper authorized mode of the surveillance (i.e., pen mode or full capture mode) and the duration of the surveillance on packet capture device 120. Upon reading warrant card 300, packet capture device 120 is automatically configured, through the use of an operating system wrapper, to operate in accordance with the warrant authority certificate. The warrant authority certificate may be hard-programmed to warrant card 300 so as not to be subject to alteration after issue.

Warrant card 300 may include one or more private keys for digitally signing and hashing the surveillance records. Warrant card 300 may also include a private key for encrypting a system event log that identifies the operational state of packet capture device 120 during a surveillance to prevent unauthorized review of the system configuration and management.

Figure 4:
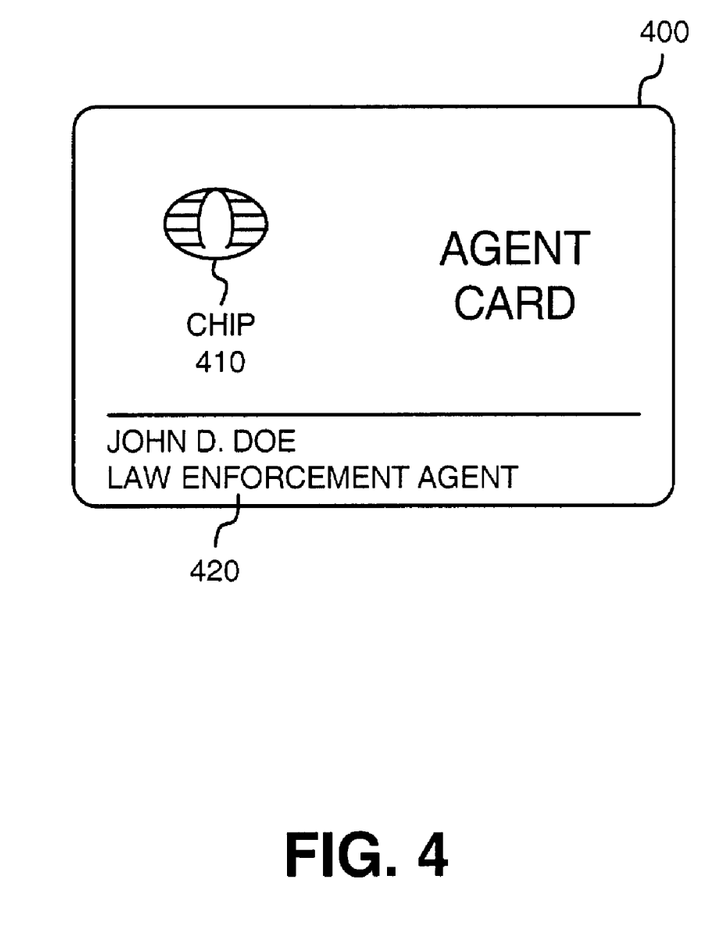
FIG. 4 illustrates an exemplary configuration of an agent card in an implementation consistent with the present invention.

FIG. 4 illustrates an exemplary configuration of an agent card 400 in an implementation consistent with the present invention. As illustrated, agent card 400 may include a microprocessor chip 410 and may optionally include information 420 that identifies the law enforcement agent to which agent card 400 has been issued. Agent card 400 may also include information (not shown) that identifies the agency (e.g., the Federal Bureau of Investigation) with which the agent is associated. Microprocessor chip 410 may contain a processor and memory configured in a manner similar to conventional smart cards.

Agent card 400 may include an agent certificate. In one implementation, the agent certificate may conform to the standard X.509v.3 format. The agent certificate may include information that enables the agent to access and activate packet capture device 120. Upon reading agent card 400, packet capture device 120 may operate in the manner dictated by warrant card 300. The agent certificate may be hard-programmed to agent card 400 so as not to be subject to alteration after issue. Agent card 400 may include one or more private keys for digitally signing the surveillance records and encrypting the surveillance records so as to preserve confidentiality of the records. Since agent card 400 includes a digital signature key that uniquely identifies a particular law enforcement agent, agent card 400 may, in one implementation consistent with the present invention, be issued to the agent in the same manner in which the agency with which the agent works would issue a badge and/or gun to an agent. In such a situation, the law enforcement agent may retain his/her agent card 400.

Exemplary Processing

Figure 5:
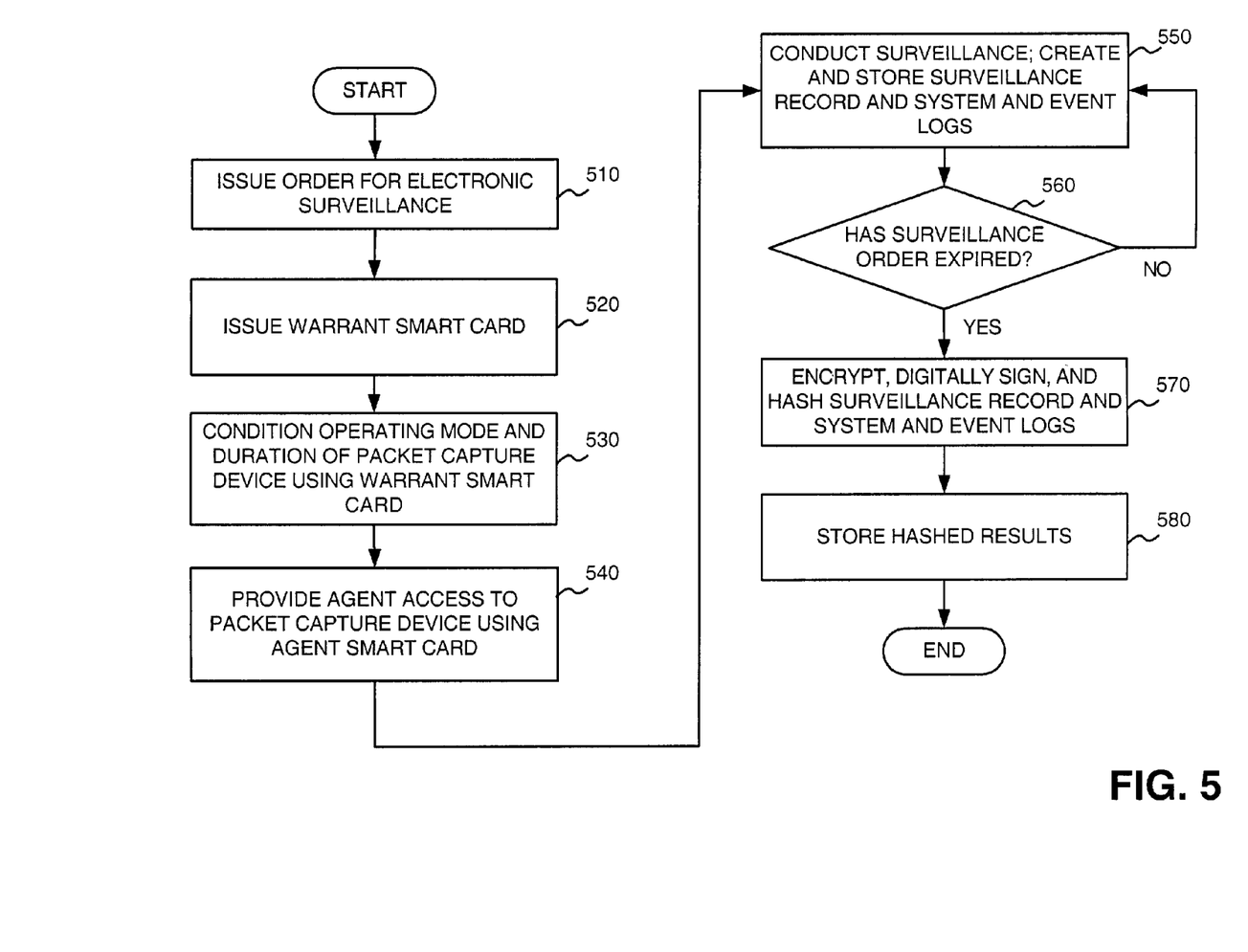
FIG. 5 illustrates an exemplary process for lawfully performing an electronic surveillance in accordance with an implementation consistent with the present invention.

FIG. 5 illustrates an exemplary process for lawfully performing an electronic surveillance in an implementation consistent with the present invention. Processing may begin with a warrant authority, such as a judicial official, issuing a warrant that authorizes law enforcement personnel to perform a lawful authorized electronic surveillance [act 510]. The warrant may authorize the law enforcement personnel to attempt to capture communication identifying information (e.g., an Internet Service Provider (ISP) account, Simple Mail Transfer Protocol (SMTP) mail address, etc.) for some subject that is engaged in some type of communication that is believed to be related to some criminal activity. The warrant authority may issue the warrant based on the showing of probable cause that this particular subject is using this communication identifying information for communications and these communications are related to criminal activity.

The warrant authority may also issue a warrant card, such as warrant card 300 (FIG. 3) [act 520]. As described above, warrant card 300 contains information that enables packet capture device 120 to be configured for proper authorized mode of surveillance (i.e., pen mode or full capture mode) as dictated by the warrant and sets the duration of the surveillance on packet capture device 120. A new warrant card 300 may be issued by the warrant authority on a case-by-case basis.

Upon receiving warrant card 300, the law enforcement agent may condition the operating mode and duration of packet capture device 120 using warrant card 300 [act 530]. The law enforcement agent may, for example, insert warrant card 300 into smart card reader 250 of packet capture device 120. Packet capture device 120 may include an operating system wrapper that automatically configures packet capture device 120 to function in the mode authorized and defined in the special extension to the warrant authority certificate embedded on warrant card 300. As one skilled in the art will appreciate, operating system wrappers limit the operating system procedures and processes to the minimal set required for operation. In one implementation, the operating system wrapper may cause packet capture device 120 to operate in a pen mode or a full capture mode. Upon reading the special extension to the warrant authority certificate, the duration of the surveillance operation, as defined in the warrant, may also be set in packet capture device 120.

The law enforcement agent may gain access to packet capture device 120 via agent card 400 [act 540]. To gain access to packet capture device 120, the law enforcement agent may, for example, insert his/her agent card 400 into smart card reader 250 of packet capture device 120. As a result, packet capture device 120 may allow the law enforcement agent to begin the surveillance operation.

Once activated, packet capture device 120 may conduct the surveillance in the mode and for the duration set by warrant card 300 [550]. As described above, in a pen mode, packet capture device 120 captures only routing and addressing information. In full capture mode, packet capture device 120 captures full packets, including all of the content of the packets. In either mode, packet capture device 120 begins storing surveillance records [act 550]. Packet capture device 120 may also record system and event information [act 550]. This system and event information may include, for example, data corresponding to the operation of packet capture device 120 (to ensure that the surveillance operation was conducted properly) and the time period(s) for which packet capture device 120 was operated.

Once the surveillance operation has been initiated by the law enforcement agent, packet capture device 120 starts a timer to determine whether the time period specified by warrant card 300 (i.e., the surveillance duration) has expired [act 560]. If the surveillance duration has not expired, packet capture device 120 may continue to conduct the surveillance operation, creating and storing surveillance records and system event logs [act 550].

If, on the other hand, the surveillance duration has expired, packet capture device 120 may encrypt, digitally sign, and hash the surveillance record and system event logs [act 570]. Packet capture device 120 may encrypt the system event logs using a private encryption key from warrant card 300 and the surveillance record using a private encryption key from agent card 400. In one implementation, packet capture device 120 may use a Federal Information Processing Standard (FIPS) 140-2 compliant encryption technique. Once encrypted, the law enforcement agent cannot view the surveillance record and system event logs. As a result, the warrant authority can have total control over the review of the surveillance record and system event logs.

Packet capture device 120 may digitally sign the surveillance record and system event logs using a private key from warrant card 300 and agent card 400. In one implementation, packet capture device uses a FIPS 186-2 compliant digital signature algorithm to digitally sign the surveillance record and system event logs. Digitally signing the surveillance record and system event logs using a private key from warrant card 300 binds the warrant authority to the warrant that determines the mode of operation and the duration of operation. Digitally signing the surveillance record and system event logs using a private key from agent card 400 binds the particular law enforcement agent associated with agent card 400 with the mode of operation and time of operation. This ensures proper judicial oversight and improves assurance and accountability for records that may be part of evidence of a legal proceeding.

Once the surveillance record and system event logs have been encrypted and digitally signed, packet capture device 120 may then hash the surveillance record and system event logs using a private hashing key from warrant card 300. In one implementation, packet capture device 120 uses a FIPS 140-2 compliant hashing algorithm (e.g., Secure Hash Algorithm-1) to compute a message digest in a well-known manner. The message digest may be used to validate the integrity of the surveillance record and assure that it has not been corrupted or altered. The message digest may also be used to validate the integrity of the operating state of packet capture device 120 to ensure that packet capture device 120 was not altered to execute unlawful/unauthorized functions.

The order of encrypting, digitally signing, and hashing may vary in other implementations consistent with the present invention. For example, in an alternative implementation, packet capture device 120 may hash, digitally sign, and then encrypt the surveillance record and system event logs.

Once the surveillance record and system event logs have been encrypted, digitally signed, and hashed, packet capture device 120 may store the resulting data on a computer-readable medium, such as a floppy disk, memory card, or compact disk [act 580]. The resulting data may include the encrypted and digitally-signed surveillance record and system event logs and the message digest. The law enforcement agent may then take the computer-readable medium to the warrant authority as evidence of the surveillance operation.

The warrant authority may validate the integrity of the evidence on the computer-readable medium by checking whether the encrypted and digitally-signed surveillance record and system event logs on the computer-readable medium produce the same message digest as generated by packet capture device 120. It will be appreciated that any change to the data stored on the computer-readable medium will result in a different message digest. Therefore, if the message digests are not identical, then the warrant authority knows with high probability that the encrypted and digitally-signed records have been corrupted or altered.

The warrant authority may verify the digital signatures of data stored on the computer-readable medium using the appropriate corresponding public keys in a well-known manner. Verifying the digital signatures of the warrant authority and law enforcement agent improves assurance and accountability for the data. As described above, the digital signature on the surveillance record binds the law enforcement agent to the record. The digital signatures on the system event logs bind the warrant authority to the mode and duration of operation of packet capture device 120 and the law enforcement agent to the mode of operation and time of operation of packet capture device 120.

Finally, the warrant authority may retrieve the surveillance record and system event logs by decrypting the surveillance record and system event logs stored on the computer-readable medium in a well-known manner. The decryption process may require a public and private key pair. The decrypted surveillance record and system event logs may then be used in deciding whether to issue a further warrant or as part of a judicial proceeding.

A packet capture device in accordance with the principles of the present invention provides the following advantages:

Confidentiality—records can be encrypted and made secure from unauthorized access.

Integrity—the surveillance process has a greatly improved assurance that it is conducted as authorized. There is objective digital proof of integrity using digital signatures and secure hash algorithms.

Greatly improved trust model—prosecutors, judges, and law enforcement supervisors have improved assurance that the agents have not made errors capable of tainting investigative records. Civil libertarians have improved assurance that law enforcement agents are not exceeding authority. Service providers have assurance that their subscribers have not been subjected to an unwarranted surveillance.

CONCLUSION

Systems and methods consistent with the present invention provide an electronic surveillance device that improves the way in which electronic surveillances are conducted. The electronic surveillance device uses a combination of public keys, private keys, smart cards, digital certificates, and operating system wrappers to improve confidentiality and integrity of the surveillance records and authentication and identification of the authorities relating to the electronic surveillance.

The foregoing description of exemplary embodiments of the present invention provides illustration and description, but is not intended to be exhaustive or to limit the invention to the precise form disclosed. Modifications and variations are possible in light of the above teachings or may be acquired from practice of the invention. For example, while the above description focused on a judicially-granted surveillance environment, the present invention is not so limited. In fact, a packet capture device according to the principles of the present invention may be implemented in other types of environments.

The above implementations can be implemented in software, hardware, or a combination of software and hardware. Thus, the present invention is not limited to any specific combination of hardware circuitry and software.

While a series of acts has been described with regard to FIG. 5, the order of the acts may be varied in other implementations consistent with the present invention. Moreover, non-dependent acts may be implemented in parallel. No element, act, or instruction used in the description of the present application should be construed as critical or essential to the invention unless explicitly described as such. Also, as used herein, the article "a" is intended to include one or more items. Where only one item is intended, the term "one" or similar language is used.

The scope of the invention is defined by the claims and their equivalents.

What is claimed is:

1. A method for performing an electronic surveillance with proper judicial oversight, comprising:

conditioning a packet capture device to include recording data corresponding to operation of the packet capture device to ensure that the surveillance was conducted properly;

conducting the electronic surveillance using the packet capture device to produce a record;

encrypting the record using a first key from a first smart card issued to a law enforcement agent;

creating a system event log, during production of the record, that identifies a current mode of operation and time period;

digitally signing the encrypted record using a second key from the first smart card to bind the law enforcement agent with the mode of operation and the time period of the surveillance to ensure the proper judicial oversight;

hashing the digitally-signed record using a third key from a second smart card;

encrypting the system event log using a fourth key from the second smart card; and digitally signing the system event log using a fifth key from the second smart card and a sixth key from the first smart card.

2. The method of claim 1 wherein the conditioning includes:

configuring the packet capture device to operate in one of a plurality of modes, and setting a duration of the electronic surveillance.

3. The method of claim 2 wherein the packet capture device is configured using the second smart card.

4. The method of claim 3 wherein the second smart card is issued by a warrant authority.

5. The method of claim 3 further comprising:

issuing the first smart card to the law enforcement agent prior to the configuring.

6. The method of claim 5 wherein the conducting is initiated using the first smart card.

7. The method of claim 1 wherein the conditioning includes:

configuring the packet capture device to operate in one of a pen mode and a full content mode.

8. The method of claim 1 wherein the performing occurs in response to the time period expiring.

9. The method of claim 1 wherein the performing at least one of encrypting, digitally signing, and hashing of the record creates a resulting record, and wherein the method further comprises:

storing the resulting record on a computer-readable medium.

10. An electronic surveillance device comprising:

logic configured to condition the electronic surveillance device for a particular mode of operation and duration and to record data corresponding to operation of the device, the data indicating if the surveillance was conducted properly;

logic configured to record packets in a network based on the configured mode of operation to create a surveillance record;

logic configured to determine whether the duration has been exceeded;

logic configured to encrypt the surveillance record using a first key from a first smart card when the duration has been exceeded, the first smart card issued to a law enforcement agent;

logic configured to digitally sign the encrypted surveillance record using a second key from the first smart card to bind the law enforcement agent with the mode of the operation and the duration to ensure proper judicial oversight;

logic configured to hash the digitally-signed surveillance record using a third key from a second smart card;

logic configured to create a system event log, during the packet recording, that identifies a current mode of operation and time period;

logic configured to encrypt the system event log using a fourth key from the second smart card; and logic configured to digitally sign the system event log using a fifth key from the second smart card and a sixth key from the first smart card.

11. The electronic surveillance device of claim 10 further comprising:

logic configured to read the second smart card which includes data for defining the mode of operation and the duration, wherein the logic for conditioning the electronic surveillance device configures the electronic surveillance device using the data from the second smart card.

12. The electronic surveillance device of claim 11 wherein the second smart card is associated with a judicial authority.

13. The electronic surveillance device of claim 10 wherein the mode of operation includes one of a pen mode and a full content mode.

14. The electronic surveillance device of claim 10 wherein the second smart card is associated with a judicial authority.

15. The electronic surveillance device of claim 10 further comprising:

logic configured to read the first smart card which includes data for providing the law enforcement agent access to the electronic surveillance device.

16. A system for conducting an electronic surveillance with proper judicial oversight, comprising:

means for configuring a packet capture device to operate in a first mode or a second mode;

means for configuring the packet capture device to operate for a predetermined duration;

means for conducting the electronic surveillance during the predetermined duration using the packet capture device to produce a surveillance record and to record data corresponding to operation of the packet capture device to ensure that the surveillance was conducted properly;

means for encrypting the surveillance record using a first key from a first smart card issued to a law enforcement agent;

means for digitally signing the encrypted surveillance record using a second key from the first smart card to bind the law enforcement agent with mode and time of the surveillance to ensure the proper judicial oversight;

means for hashing the digitally-signed surveillance record using a third key from a second smart card;

means for configuring the packet capture device to create a system event log, during the predetermined duration, that identifies mode of operation and time period;

means for configuring the packet capture device to encrypt the system event log using a fourth key from the second smart card; and means for configuring the packet capture device to digitally sign the system event log using a fifth key from the second smart card and a sixth key from the first smart card.

17. A method for performing an electronic surveillance, comprising;

issuing to a law enforcement agent from a warrant authority both a warrant-related smart card and a law enforcement agent smart card to impose proper judicial oversight on the surveillance;

using the warrant-related smart card to condition a packet capture device to include recording data corresponding to operation of the packet capture device to ensure that the surveillance was conducted properly;

using the law enforcement agent smart card to initiate conducting the electronic surveillance by the packet capture device to produce a surveillance record;

configuring the packet capture device to create a system event log during production of the surveillance record that identifies mode and time of the surveillance;

digitally signing and hashing the surveillance record to bind the law enforcement agent conducting the surveillance with the mode and time of the surveillance to allow the proper judicial oversight;

computing a message digest to (1) validate integrity of the surveillance record where the record has not been corrupted or altered and (2) ensure that the device was not altered to execute unlawful or unauthorized functions;

configuring the packet capture device to encrypt the system event log using a key from the warrant-related smart card; and configuring the packet capture device to digitally sign the system event log using another key from the warrant-related smart card and a different key from the law enforcement agent smart card.

* * * * *